(12) United States Patent
Hsu et al.

(10) Patent No.: US 7,379,400 B2
(45) Date of Patent: May 27, 2008

(54) METHOD AND APPARATUS OF ACCESSING BCA DATA

(75) Inventors: Han-Wen Hsu, Hsinchu (TW); Chi-Pei Huang, Miaoli (TW)

(73) Assignee: Mediatek Inc., Hsin-Chu (TW)

( * ) Notice: Subject to any disclaimer, the term of this patent is extended or adjusted under 35 U.S.C. 154(b) by 593 days.

(21) Appl. No.: 11/134,196

(22) Filed: May 20, 2005

(65) Prior Publication Data
US 2005/0259550 A1    Nov. 24, 2005

(30) Foreign Application Priority Data
May 21, 2004    (TW) ............................... 93114556 A

(51) Int. Cl.
*G11B 7/00* (2006.01)
(52) U.S. Cl. ................. 369/47.1; 369/47.27; 369/53.22
(58) Field of Classification Search ............... 369/47.1, 369/47.27, 47.28, 53.1, 53.11, 53.22, 53.29, 369/53.31
See application file for complete search history.

(56) References Cited

U.S. PATENT DOCUMENTS 6,909,679 B2 *    6/2005    Chou et al. .............. 369/53.35

* cited by examiner

*Primary Examiner*—Nabil Hindi
(74) *Attorney, Agent, or Firm*—Hoffman, Warnick & D'Alessandro, LLC

(57) ABSTRACT

An optical data recording/reproducing system comprises a data slicer and a data extractor, wherein the data slicer receives the analog RF signal from the identification area and generates a digital mask signal and a digital pulse signal, and the reference clock generator comprises a phase-locked loop for receiving the digital pulse signal and the digital mask signal and generates the reference clock signal to the data extractor by performing phase-locked loop control, so that the data extractor extracts an identification area data signal and an identification area clock signal from the digital mask signal according to the reference clock signal.

29 Claims, 7 Drawing Sheets

METHOD AND APPARATUS OF ACCESSING BCA DATA

BACKGROUND OF THE INVENTION

1. Field of the Invention

The present invention relates to a reference clock generator used in an optical data recording/reproducing system.

2. Description of the Prior Art

Identification information of the original optical recording medium can be recorded in the burst cutting area (BCA) of the optical recording medium, and the identification information is called the BCA data. The identification information in the BCA of the optical recording medium can be decoded to identify whether the optical recording medium is an original edition or not. The accessing apparatus of the optical recording medium can access the analog RF signal of the BCA, and the BCA data decoder then decodes the BCA data by the analog RF signal of the BCA. This process is called BCA data decoding.

Referring to FIG. 1 and FIG. 2, FIG. 1 is a schematic diagram of the BCA 11 of the optical recording medium of the prior art, and FIG. 2 is a block diagram of the BCA data decoder 13 of the prior art. The BCA 11 is located in an inner part of a lead-in area of the optical recording medium 10. The identifying information of the BCA 11 can be decoded by a BCA data decoder 13 of the prior art.

The BCA data decoder 13 comprises a reference frequency generating circuit 12 and a BCA data decoding circuit 15. The reference frequency generating circuit 12 comprises a quartz oscillator 16 and a frequency divider circuit 18. The quartz oscillator 16 can generate an oscillating frequency. The reference frequency generating circuit 12 is used for generating a BCA reference frequency 14, wherein the BCA reference frequency 14 is obtained according to the oscillating frequency, which is generated by the quartz oscillator 16, and passing the frequency divider circuit 18.

The BCA data decoding circuit 15 comprises a data slicer 22 and a data extractor 32. The data slicer 22 receives the analog RF signal 20 with RF modulation and parallel marks with low reflection rate from the BCA and generates a BCA digital pulse signal 26. Then, the data extractor 32 counts the width of the BCA digital pulse signal 26 by utilizing the BCA reference frequency 14. Finally, the BCA data decoding circuit obtains the identifying information according to the counting result, and the phase encoding principle of the BCA digital pulse signal, the RZ (return-to-zero) modulation method and the data structure of the specification. In the prior art, the spindle motor of the accessing apparatus of the optical recording medium accesses the analog RF signal 20 of the BCA of the optical recording medium 10 in the CAV (constant angular velocity) and counts the BCA digital pulse signal 26 in a constant BCA reference frequency. Because the BCA data decoder 13 of the prior art counts the BCA digital pulse signal 26 by a constant BCA reference frequency 14, the spindle motor needs to process the digital pulse signal with the normalization to obtain the correct decoding information when the CAV rotational speed control of the spindle motor has an error or controls different rotational speed.

In the above prior art, the analog RF signal 20 of the BCA of the optical recording medium 10 is accessed in the CAV; the decoding process not only has an added processing step of normalization of the BCA digital pulse signal 26, but it also can not correctly decode the identifying information because the spindle motor is a machine, and the time of reaching the steady state of the spindle motor is longer than the time of reaching the steady state of the circuit, so the generated BCA reference frequency variation can not synchronize with the RF signal variation of the BCA.

SUMMARY OF THE INVENTION

The present invention provides a reference clock signal generator for generating a reference clock signal in an optical data recording/reproducing system to identify identification information of an analog RF signal reproduced from an identification area of an optical recording medium. The optical data recording/reproducing system further comprises a data slicer and a data extractor. The data slicer receives the analog RF signal from the identification area and generates a digital mask signal and a digital pulse signal. The reference clock generator comprises a phase-locked loop for receiving the digital pulse signal and the digital mask signal, and it generates the reference clock signal to the data extractor by performing phase-locked loop control, so that the data extractor extracts an identification area data signal and an identification area clock signal from the digital mask signal according to the reference clock signal.

BRIEF DESCRIPTION OF THE APPENDED DRAWINGS

DETAILED DESCRIPTION OF THE INVENTION

Figure 1:
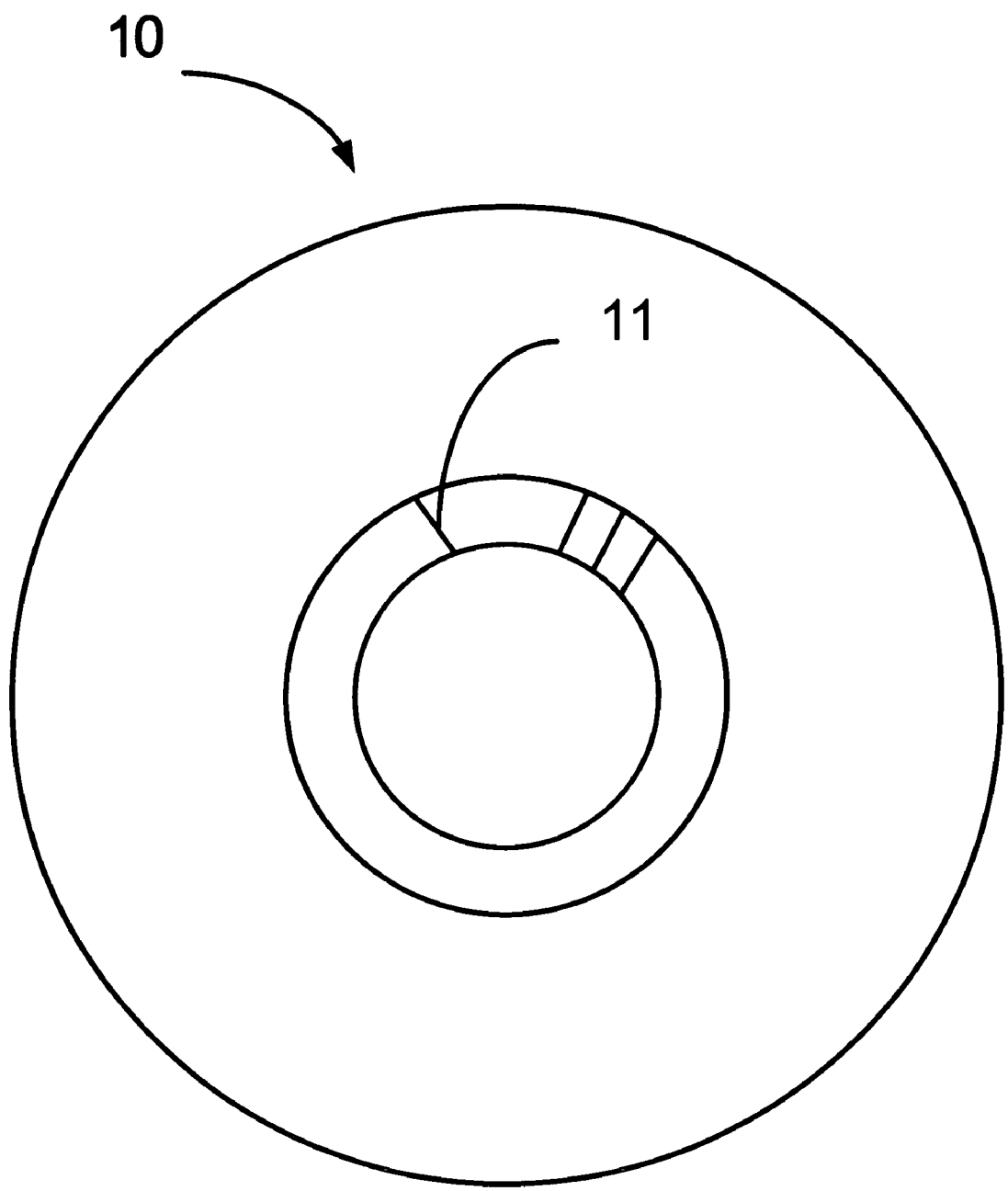
FIG. 1 is a schematic diagram of the BCA identification area of the optical recording medium of the prior art.
Figure 2:
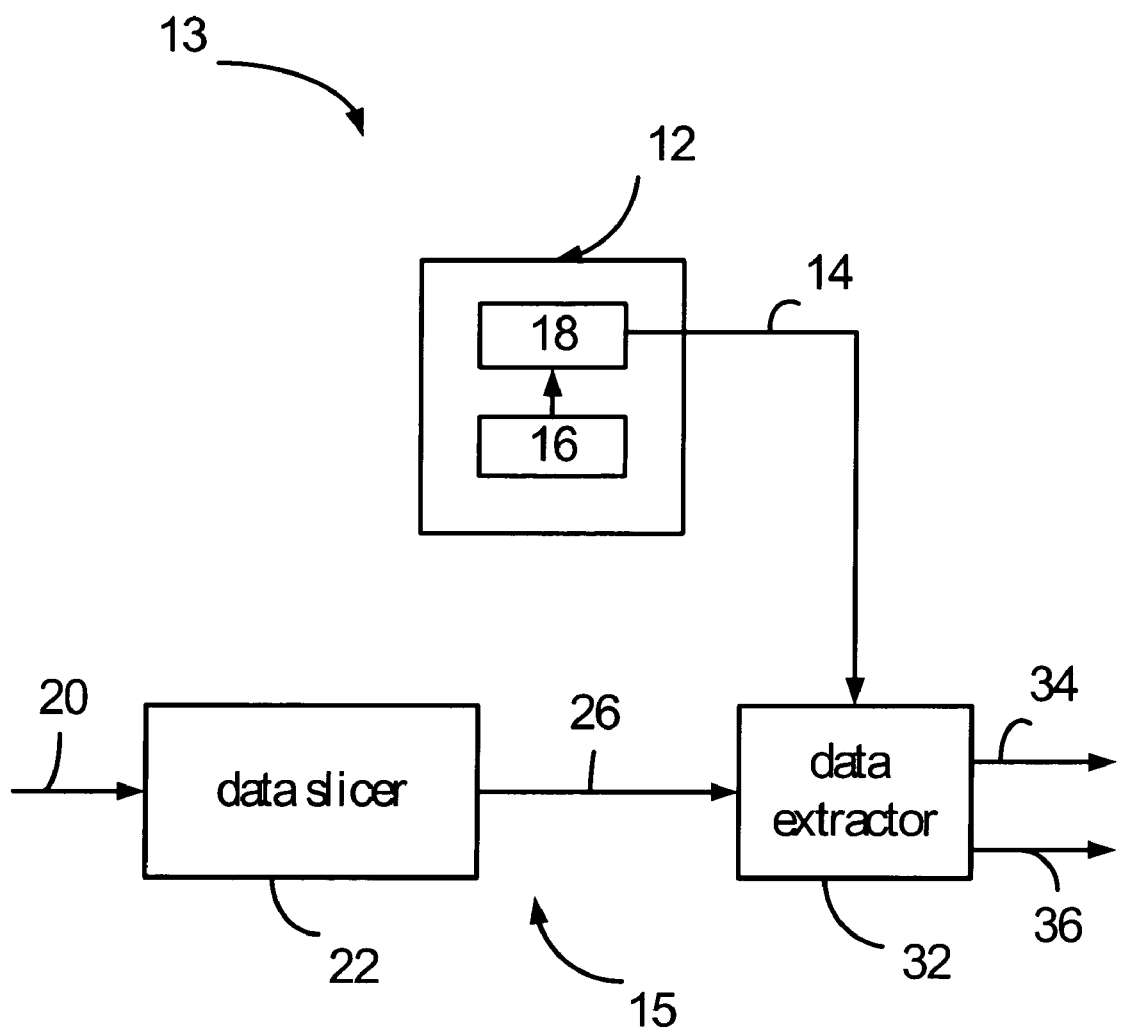
FIG. 2 is a block diagram of the BCA data decoder of the prior art.
Figure 3:
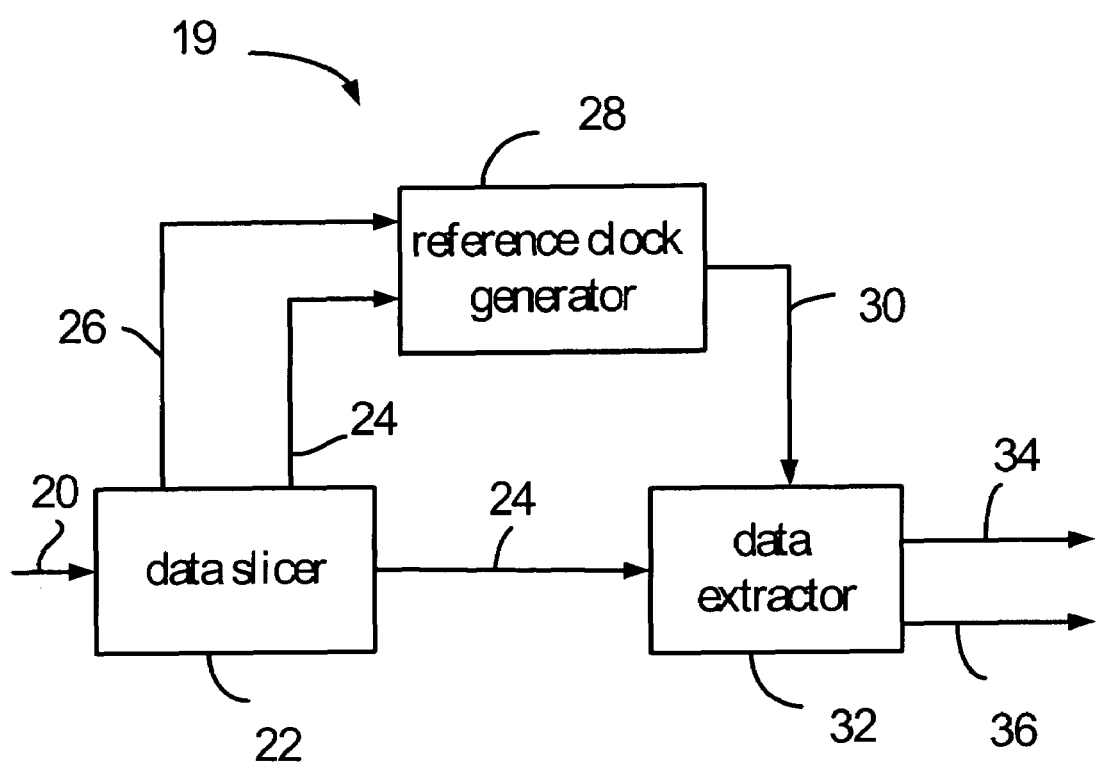
FIG. 3 is a block diagram of some of the parts of the reference clock generator and the optical data recording/reproducing system which is used in an optical data recording/reproducing system of the invention.
Figure 4:
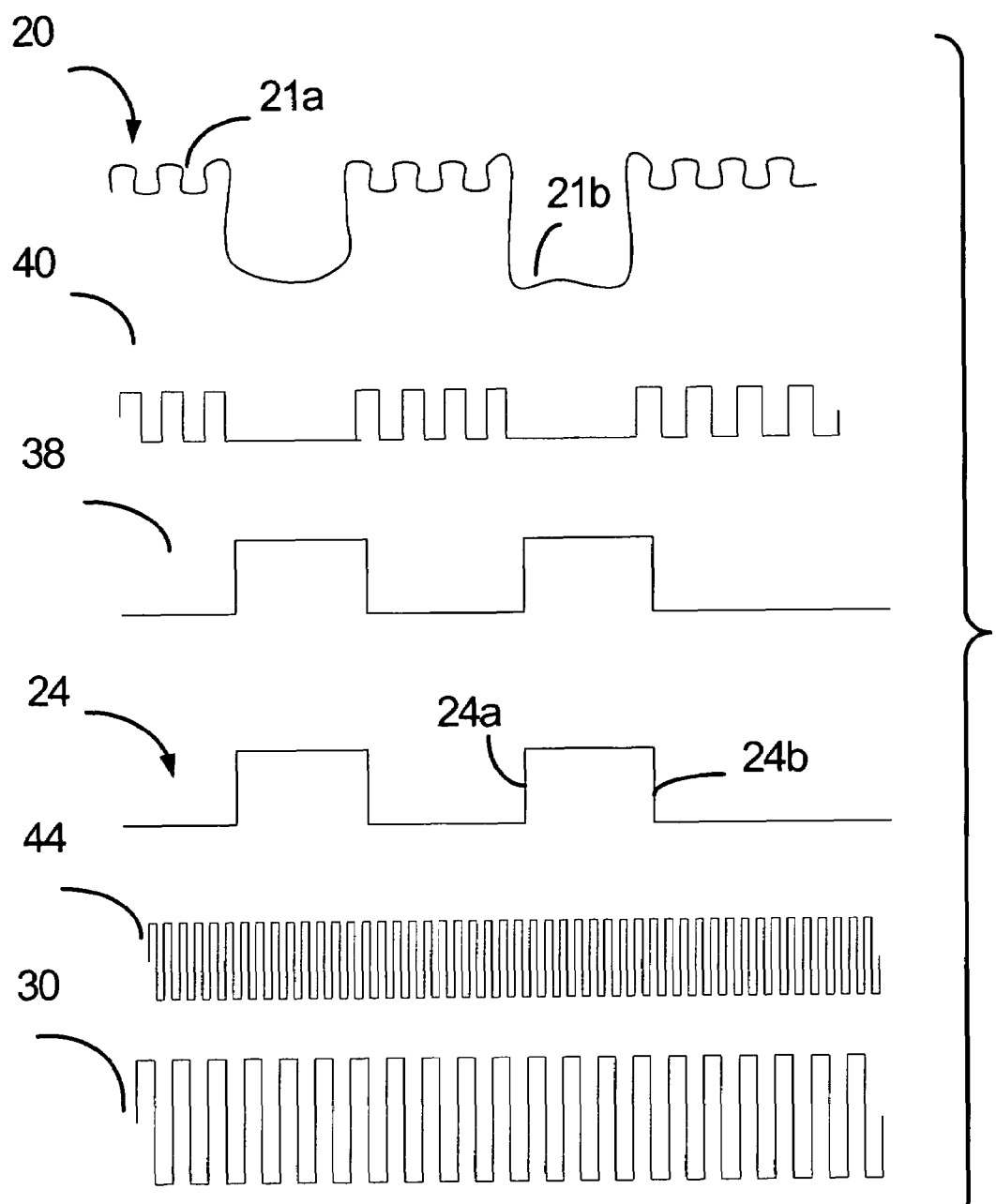
FIG. 4 is a schematic diagram of different kinds of signals of the reference clock generator of the invention.

Referring to FIG. 3 and FIG. 4, FIG. 3 is a block diagram of some of the parts of the reference clock generator 28 and the optical data recording/reproducing system 19 which is used in an optical data recording/reproducing system 19 of the invention. FIG. 4 is a schematic diagram of different kinds of signals of the reference clock generator 28 of the invention. The statement below is also explained by the optical recording medium 10 of FIG. 1. According to an embodiment of the invention, a reference clock generator 28 is used for generating a reference clock signal in an optical data recording/reproducing system 19 to identify the identification information of an analog RF signal 20 which is recorded in a BCA 11 of the optical recording medium 19; the identification information is the BCA data. The identification information is utilized to identify whether the optical recording medium is legitimately an original medium or not. As shown in FIG. 1, BCA 11 is located in an inner part of a lead-in area of the optical recording medium 10. The reference clock signal, which is generated by the reference clock generator 28, is a BCA reference clock signal 30.

As shown in FIG. 3, the optical data recording/reproducing system 19 further comprises a data slicer 22 and a data extractor 32. The data slicer 22 is used to receive the analog RF signal 20 of the BCA 11, so as to generate a BCA digital mask signal 24 and a BCA digital pulse signal 26. The reference clock generator 28 comprises a phase-locked loop (shown in FIG. 5) for receiving the BCA digital pulse signal 26 and the BCA digital mask signal 30, and the BCA reference clock signal 30 is generated by performing phase-locked loop control to be transferred to the data extractor 32, so that the data extractor 32 can extract an identification area data signal and an identification area clock signal from the BCA digital mask signal 24 according to the BCA reference clock signal 30. The identification area data signal and an identification area clock signal are respectively the BCA data signal 34 and a BCA clock signal 36. The optical data recording/reproducing system 19 further comprises a memory (not shown); the optical data recording/reproducing system 19 stores the BCA data signal 34 in the memory according to the BCA clock signal 36.

Figure 5:
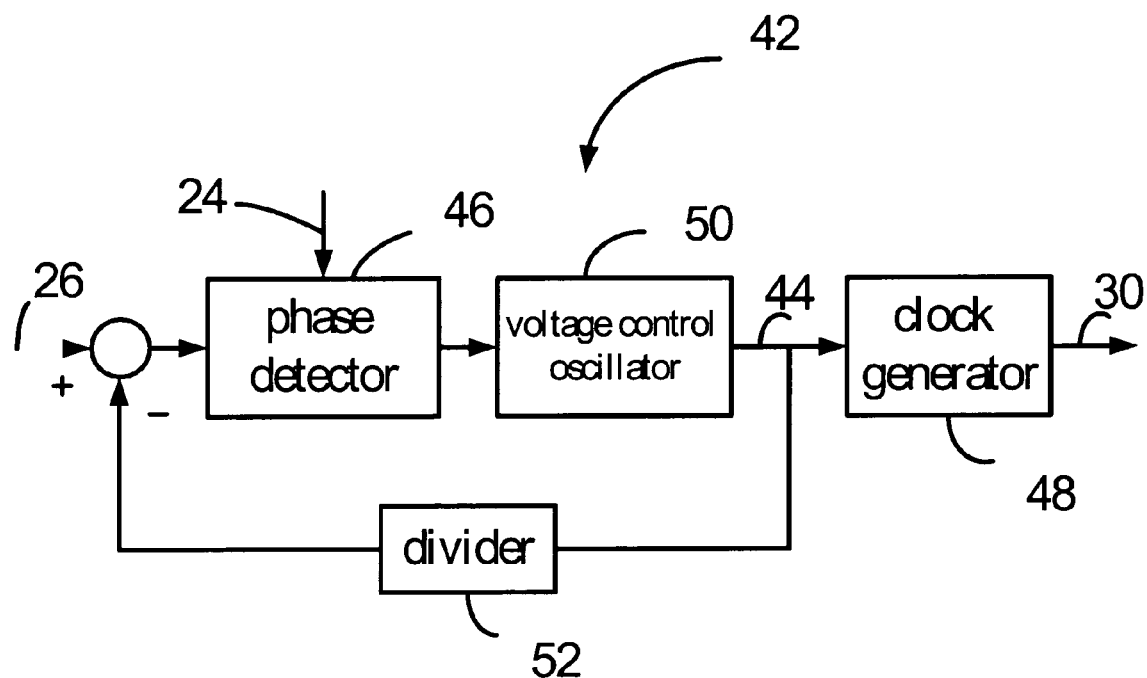
FIG. 5 is a schematic block diagram of the phase-locked loop of the reference clock generator which is shown in FIG. 3.

The analog RF signal 20 is the analog RF signal reproduced from the identification area 11. The BCA 11 includes a series of laser-cut and substantially parallel marks with low reflection rate. The marks are substantially perpendicular to the recording track of the optical recording medium 10 and are substantially parallel to the radial direction of the optical recording medium 10. As shown in FIG. 4, the analog RF signal 20 forms a plurality of RF signal units 21a and a plurality of narrow signal units 21b with low reflection rate due to the series of laser-cut marks with low reflection rate; each of the RF signal units 21a is formed by superimposing a rectangular signal portion 38 and an RF signal portion 40. The data slicer 22 generates the BCA digital mask signal 24 according to the rectangular signal portions 38, and the BCA digital pulse signal 26 is generated by segmenting the RF signal portions 40 according to a reference level. Referring to FIG. 5, FIG. 5 is a schematic block diagram of the phase-locked loop 42 of the reference clock generator 28 which is shown in FIG. 3. The reference clock generator 28 comprises a phase-locked loop 42. The phase-locked loop 42 comprises a phase detector 46, a voltage control oscillator 50, a divider 52, and a clock generator 48. The phase-locked loop 42 is used for generating an oscillation signal with a predetermined frequency. The phase-locked loop 42 compares the oscillation signal with the phase difference of the BCA digital pulse signal 26 and generates the phase-lock reference frequency signal 44. Then, the clock generator 48 transforms the phase-lock reference frequency signal 44 into the BCA reference clock signal 30. At this time, the BCA reference clock signal 30 is the divided frequency of the phase-lock reference frequency signal 44.

According to the phase-lock loop 42 of the invention, the phase-lock reference frequency signal 44 is a signal with a frequency higher than the BCA digital pulse signal 26. Beside, the voltage control oscillator 50 and the divider 52 of the phase-lock loop 42 are the same as the phase-lock loop of the prior art. However, the difference between the phase-lock loop 42 and the phase-lock loop of the prior art is that the phase detector 46 of the invention utilizes the BCA digital mask signal 24 as the control signal. Each pulse in the BCA digital mask signal 24 comprises a positive-edge 24a and a negative-edge 24b, as shown in FIG. 4. Between the positive-edge 24a and the negative-edge 24b of each pulse of the BCA digital mask signal 24, the phase-lock loop 42 will stop working or reduce the loop gain to prevent the occurrence of errors. In fact, because the frequency of the BCA digital mask signal 24 is much lower than the frequency of the phase-lock reference frequency 44, the main objective of the clock generator 48 is to generate a counting frequency with lower frequency, so as to count the mask time of the BCA digital mask signal 24.

Figure 6:
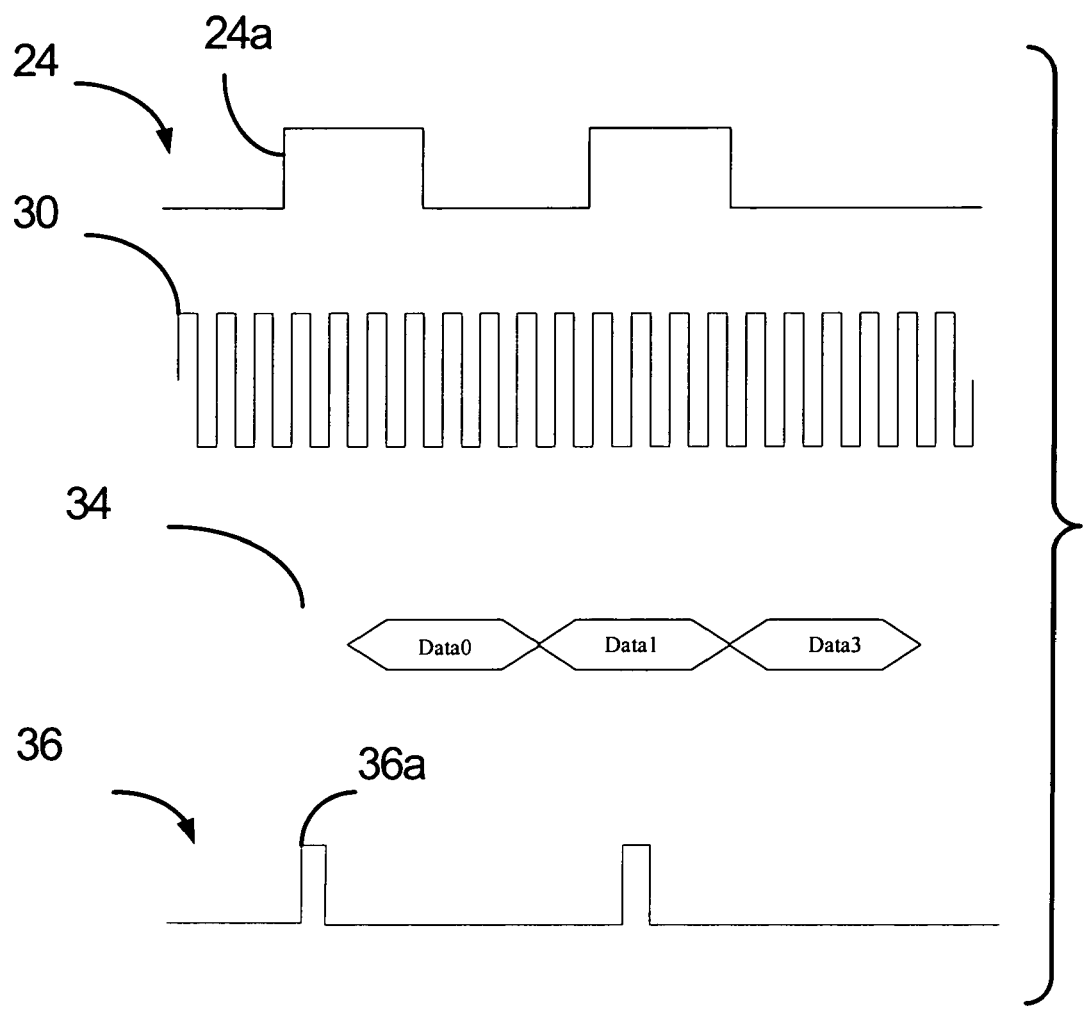
FIG. 6 is a schematic diagram of the data extractor to extract the BCA data signal of FIG. 3.

Referring to FIG. 6, FIG. 6 is a schematic diagram of the data extractor 32 extracting the BCA data signal 34 of FIG. 3. Between the positive-edge 24a and the negative-edge 24b of each pulse of the BCA digital mask signal, the data extractor 32 counts the width of each pulse in the BCA digital mask signal 24 according to the BCA reference clock signal 30; the counting result is the BCA data signal 34. When the positive-edge 24a of each pulse of the BCA digital mask signal 24 appears, the data extractor 32 generates a corresponding pulse 36a and forms the BCA clock signal 36. Then, the data extractor 32 obtains the BCA information after a return-to-zero demodulation (RZ demodulation) procedure and a phase decoding procedure are further performed.

Figure 7:
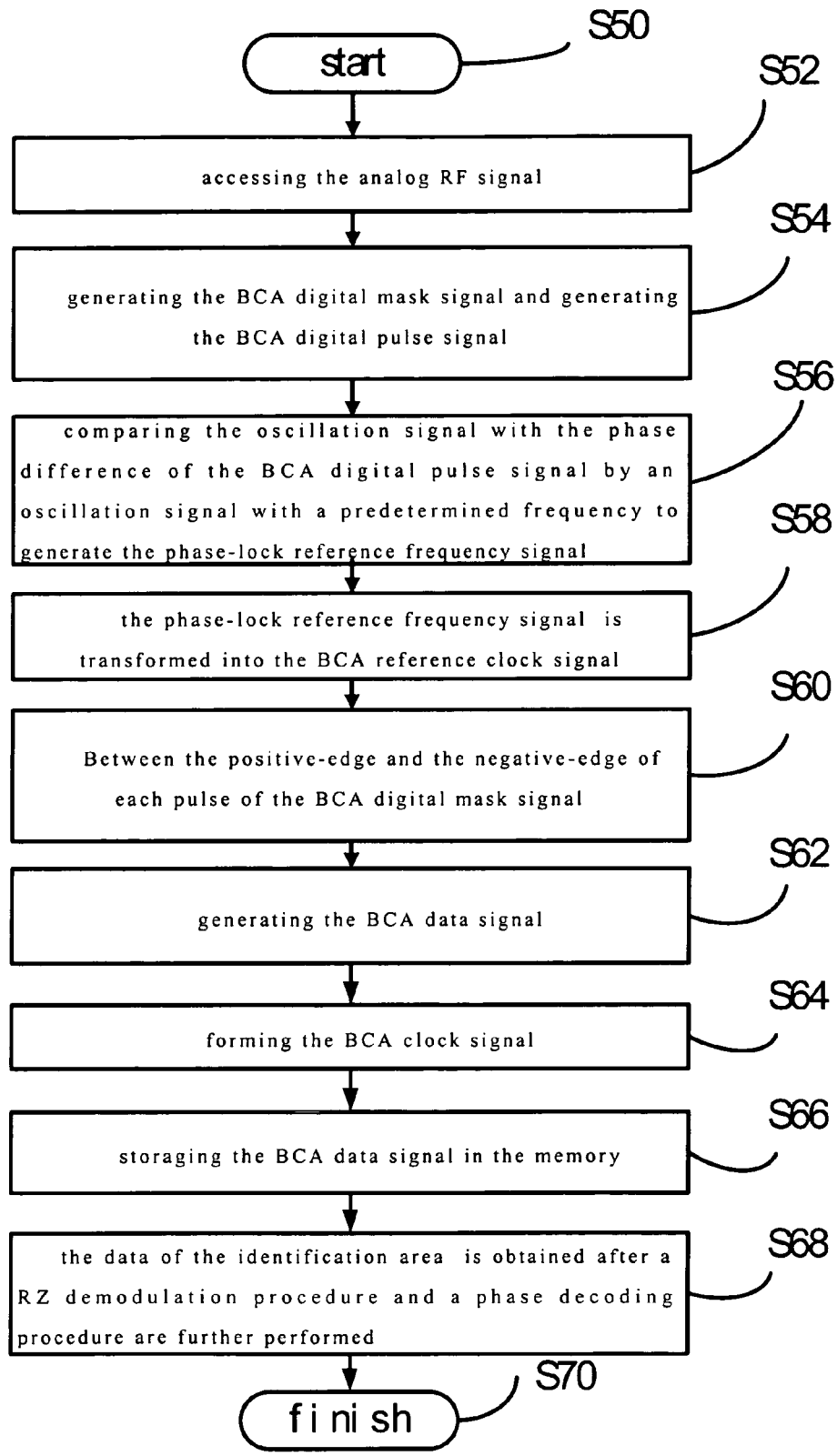
FIG. 7 is a flow chart of the data accessing method in the identification area of the optical recording medium of the invention.

Comparing to the prior art, the BCA reference clock signal 30 of the invention is generated by passing the analog RF signal 20 through the phase-lock loop 42, so that when the frequency of the analog RF signal 20 is heightened, the frequency of the BCA reference clock signal 30 can also be heightened immediately. Comparing to the prior art which utilizes mechanism to control the angular velocity of the spindle motor, the invention can further reach the steady state immediately and reduce the occurrence of errors. Because the time needed by the phase-lock loop to reach the steady state is much less than the time needed by the spindle motor to change velocity, if the rotational speed of the spindle motor is changed, the frequency of the BCA reference clock signal 30 can automatically adjust in the same ratio immediately. Referring to FIG. 7 and FIG. 3, FIG. 7 is a flow chart of the data accessing method in the identification area of the optical recording medium of the invention. The invention also provides data accessing apparatus and its data accessing method for the identification area of the optical recording medium. As shown in FIG. 3, the data slicer 22, the reference clock generator 28, and the data extractor 32 can together be regarded as a data accessing apparatus for the identification area of the optical recording medium; the apparatus is used to generate the reference clock signal 30 to help the optical data recording/reproducing system identify an identification information of an analog RF signal 20 reproduced from the identification area 11.

The data accessing method for the identification area of the optical recording medium of the invention comprises the following steps:

Step S50: start;

Step S52: access the analog RF signal 20 of the BCA identification area 11 of the optical recording medium;

Step S54: according to the rectangular signal portion 38 of the analog RF signal 20, generate the BCA digital mask signal 24, and generate the BCA digital pulse signal 26 by segmenting the RF signal portions 40 of the analog RF signal according to a reference level;

Step S56: the phase-locked loop 42 generates an oscillation signal with a predetermined frequency and compares the oscillation signal with the phase difference of the BCA digital pulse signal 26, so as to generate the phase-lock reference frequency signal 44;

Step S58: the phase-lock reference frequency signal 44 is transformed into the BCA reference clock signal 30, so that the BCA reference clock signal 30 is the multiplied frequency of the phase-lock reference frequency signal 44;

Step S60: Between the positive-edge 24a and the negative-edge 24b of each pulse of the BCA digital mask signal 24, the phase-lock loop 42 stops working;

Step S62: each pulse n the BCA digital mask signal 24 is counted by the BCA reference clock signal 30 to generate the BCA data signal 34.

Step S64: when the positive-edge 24a of each pulse of the BCA digital mask signal 24 appears, a corresponding pulse is generated to form the BCA clock signal 36;

Step S66: according to the BCA clock signal 36, the BCA data signal 34 is stored in the memory;

Step S68: the data of the identification area of the optical recording medium is obtained after a return-to-zero demodulation (RZ demodulation) procedure and a phase decoding procedure are further performed;

Step S70: finish.

According to the data accessing method of the invention, the optical data recording/reproducing system can access the analog RF signal of the identification area of the optical recording medium and generate an identification area data signal by using the analog RF signal to perform phase-locked loop control; then, the identification area data of the identification area can be extracted to identify whether the optical recording medium is legitimately an original medium or not, and the objective of protecting intellectual property rights can be reached.

The data accessing method and apparatus of the identification area of the optical recording medium of the invention utilizes a data slicer to receive an analog RF signal of an identification area, so as to generate a digital mask signal and a digital pulse signal, and then a reference clock generator is used to receive the digital pulse signal and the digital mask signal; furthermore, the phase-locked loop control is performed to generate a reference clock signal to a data extractor. The data extractor counts the width of each pulse in the digital mask signal according to the BCA reference clock signal, and the identification area data is obtained after a return-to-zero demodulation (RZ demodulation) procedure and a phase decoding procedure are further performed. Comparing to the prior art, the invention does not use the quartz oscillator, and it can skip the step of the digital pulse signal normalization during the decoding process in the prior art.

The reference clock signal of the invention is generated by passing the analog RF signal of the identification area of the optical recording medium through the phase-locked loop; the change of the reference clock signal can be synchronized with the change of the analog RF signal of the identification area of the optical recording medium to obtain the correct information.

Furthermore, in the decoding process of the invention, the digital mask signal can be used to control the reference clock generator to stop working in the low reflection ratio area, so as to prevent the occurrence of errors in the phase-lock loop.

What is claimed is:

1. A reference clock signal generator used in an optical data recording/reproducing system for generating a reference clock signal to identify an identification information of an analog RF signal reproduced from an identification area of an optical recording medium, the optical data recording/reproducing system further comprising a data slicer and a data extractor, the data slicer receiving the analog RF signal from the identification area and generating a digital mask signal and a digital pulse signal, the reference clock generator comprising a phase-locked loop for receiving the digital pulse signal and the digital mask signal and generating the reference clock signal to the data extractor by performing phase-locked loop control, the data extractor extracting an identification area data signal and an identification area clock signal from the digital mask signal according to the reference clock signal.

2. The reference clock generator of claim 1, wherein the identification area is a burst cutting area (BCA) located in an inner part of a lead-in area of the optical recording medium, and the BCA includes a series of laser-cut and substantially parallel marks with low reflection rate, and the identification information of the identification area is a BCA information.

3. The reference clock generator of claim 2, wherein the marks are substantially perpendicular to the recording tracks of the optical recording medium and are substantially parallel to the radial direction of the optical recording medium.

4. The reference clock generator of claim 2, wherein the analog RF signal forms a plurality of RF signal units and a plurality of narrow signal units with low reflection rate due to segmentation by the marks, and each of RF signal units is formed by superposing a rectangular signal portion and a RF signal portion.

5. The reference clock generator of claim 4, wherein the digital pulse signal is a BCA digital pulse signal, and the data slicer generates the digital mask signal according to the rectangular signal portions and also generates the BCA digital pulse signal by segmenting the RF signal portions according to a reference level.

6. The reference clock generator of claim 5, wherein the phase-locked loop generates an oscillation signal with a predetermined frequency, and the phase-locked loop further generates a BCA reference clock signal by comparing a phase difference between the oscillation signal and the BCA digital pulse signal.

7. The reference clock generator of claim 5, wherein the reference clock signal generated by the reference clock generator is a BCA reference clock signal, and the identification area information signal and the identification area clock signal extracted by the data extractor from the digital mask signal are a BCA information signal and a BCA clock signal respectively.

8. The reference clock generator of claim 7, wherein the data extractor counts the width of each pulse in the BCA digital mask signal according to the BCA reference clock signal, and the BCA information is obtained after a return-to-zero demodulation (RZ demodulation) procedure and a phase decoding procedure are further performed.

9. The reference clock generator of claim 7, wherein each pulse in the BCA digital mask signal comprises a positive-edge and a negative-edge, and when the positive-edge of each pulse in the BCA digital mask signal appears, the data extractor generates a corresponding pulse to form the BCA clock signal.

10. The reference clock generator of claim 7, wherein the optical data recording/reproducing system further comprises a memory, and the optical data recording/reproducing system stores the BCA information signal into the memory according to the BCA clock signal.

11. The reference clock generator of claim 1, wherein the identification information is utilized to identify whether the optical recording medium is legitimately an original medium or not.

12. A method of generating a reference clock signal, the reference clock signal being used in an optical data recording/reproducing system to identify an identification information of an analog RF signal reproduced from an identification area of an optical recording medium, the optical data recording/reproducing system further comprising a data slicer and a data extractor, the data slicer receiving the analog RF signal from the identification area to generate a digital mask signal and a digital pulse signal, the method comprising the steps of:

using a phase-locked loop to receive the digital pulse signal and the digital mask signal, and generating the reference clock signal accordingly by performing phase-locked loop control;

wherein the data extractor extracts an identification area data signal and an identification area clock signal from the digital mask signal according to the reference clock signal.

13. The method of claim 12, wherein the identification area is a burst cutting area (BCA) located in an inner part of a lead-in area of the optical recording medium, and the BCA includes a series of laser-cut and substantially parallel marks with low reflection rate.

14. The method of claim 13, wherein the analog RF signal form a plurality of RF signal units and a plurality of narrow signal units with low reflection rate due to segmentation by the marks, and each of RF signal units is formed by superposing a rectangular signal portion and a RF signal portion.

15. The method of claim 14, wherein the digital pulse signal is a BCA digital pulse signal, and the data slicer generates the digital mask signal according to the rectangular signal portions and also generates the BCA digital pulse signal by segmenting the RF signal portions according to a reference level.

16. The method of claim 15, wherein the phase-locked loop generates an oscillation signal with a predetermined frequency, and the phase-locked loop further generates a BCA reference clock signal by comparing the phase difference between the oscillation signal and the BCA digital pulse signal.

17. The method of claim 15, wherein the reference clock signal is a BCA reference clock signal, and the identification area information signal and the identification area clock signal extracted by the data extractor from the digital mask signal are a BCA information signal and a BCA clock signal respectively.

18. The method of claim 17, wherein the data extractor counts the width of each pulse in the BCA digital mask signal according to the BCA reference clock signal, and the BCA information is obtained after a return-to-zero demodulation (RZ demodulation) procedure and a phase decoding procedure are further performed.

19. The method of claim 17, wherein each pulse in the BCA digital mask comprises a positive-edge and a negative-edge, and when the positive-edge of each pulse in the BCA digital mask signals appears, the data extractor generates a corresponding pulse to form the BCA clock signal.

20. The method of claim 17, wherein the optical data recording/reproducing system further comprises a memory, and the optical data recording/reproducing system stores the BCA information signal into the memory according to the BCA clock signal.

21. An identification area information reading device for generating a reference clock signal to identify an identification information of an analog RF signal reproduced from an identification area of an optical recording medium, the device comprising:

a data slicer for receiving the analog RF signal in the identification area and to generate a digital mask signal and a digital pulse signal;

a reference clock generator comprising a phase-locked loop for receiving the digital pulse signal and the digital mask signal to generate the reference clock signal by performing phase-locked loop control; and a data extractor for receiving the reference clock signal and the digital mask signal to generate an identification area data signal and an identification area clock signal.

22. The device of claim 21, wherein the identification area is a burst cutting area (BCA) located in an inner part of a lead-in area of the optical recording medium, and the BCA includes a series of laser-cut and substantially parallel marks with low reflection rate, and the identification information of the identification area is a BCA information.

23. The device of claim 22, wherein the analog RF signal forms a plurality of RF signal units and a plurality of narrow signal units with low reflection rate due to segmentation by the marks, and the RF signal units is formed by superposing a rectangular signal portion and a RF signal portion.

24. The device of claim 22, wherein the digital pulse signal is a BCA digital pulse signal, and the data slicer generates the digital mask signal according to the rectangular signal portions, and the data slicer generates the BCA digital pulse signal by segmenting the RF signal portions according to a reference level.

25. The device of claim 24, wherein the phase-locked loop generates an oscillation signal with a predetermined frequency, and the phase-locked loop further generates a BCA reference clock signal by comparing the phase difference between the oscillation signal and the BCA digital pulse signal.

26. The device of claim 25, wherein the reference clock signal generated by the reference clock generator is a BCA reference clock signal, and the identification area information signal and the identification area clock signal extracted by the data extractor from the digital mask signal are a BCA information signal and a BCA clock signal respectively.

27. The device of claim 26, wherein the data extractor counts the width of each pulse in the BCA digital mask signal according to the BCA reference clock signal, and the BCA information is obtained after a return-to-zero demodulation (RZ demodulation) procedure and a phase decoding procedure are further performed.

28. The device of claim 26, wherein each pulse in the BCA digital mask signal comprises a positive-edge and a negative-edge, and when the positive-edge of each pulse in the BCA digital mask signal appears, the data extractor generates a corresponding pulse to form the BCA clock signal.

29. The device of claim 26, wherein the optical data recording/reproducing system further comprises a memory, and the optical data recording/reproducing system stores the BCA information signal into the memory according to the BCA clock signal.

* * * * *